United States Patent
Rehan et al.

(10) Patent No.: US 10,476,930 B2
(45) Date of Patent: Nov. 12, 2019

(54) CLIENT/SERVER SIGNALING COMMANDS FOR DASH

(71) Applicant: INTEL IP CORPORATION, Santa Clara, CA (US)

(72) Inventors: Mohamed M. Rehan, Cairo (EG); Rana A. Morsi, Cairo (EG); Ozgur Oyman, San Jose, CA (US); Vishwanath Ramamurthi, Sunnyvale, CA (US)

(73) Assignee: INTEL IP CORPORATION, Santa, CA (US)

( * ) Notice: Subject to any disclaimer, the term of this patent is extended or adjusted under 35 U.S.C. 154(b) by 610 days.

(21) Appl. No.: 14/583,036

(22) Filed: Dec. 24, 2014

(65) Prior Publication Data

US 2015/0195328 A1    Jul. 9, 2015

Related U.S. Application Data

(60) Provisional application No. 61/924,194, filed on Jan. 6, 2014.

(51) Int. Cl.
*H04L 29/06* (2006.01)
*H04L 29/08* (2006.01)

(52) U.S. Cl.
CPC .......... *H04L 65/80* (2013.01); *H04L 65/4076* (2013.01); *H04L 65/602* (2013.01);
(Continued)

(58) Field of Classification Search
CPC ... H04L 65/80; H04L 65/4079; H04L 65/602; H04L 65/608
See application file for complete search history.

(56) References Cited

U.S. PATENT DOCUMENTS 7,925,771 B1 *  4/2011  Ping ............... H04L 65/4092
                                                     709/203
8,223,788 B1 *  7/2012  Perelstain .............. 370/412
(Continued)

FOREIGN PATENT DOCUMENTS

| JP | 2002516008 A1 | 5/2002 |
| JP | 2006203505 A  | 8/2006 |
| WO | 2013048484 A1 | 4/2013 |

OTHER PUBLICATIONS

Lederer et al.; Towards Peer-Assisted Dynamic Adaptive Streaming over HTTP; IEEE International Packet Video Workshop; May 10-11, 2012; Munich Germany.
(Continued)

*Primary Examiner* — Backhean Tiv
*Assistant Examiner* — Jihad K Boustany
(74) *Attorney, Agent, or Firm* — Thorpe North & Western

(57) ABSTRACT

Technology to provide improved quality-of-experience-aware multimedia streaming is disclosed. Several types of communications that can be made between clients and servers are described. These communications enable improvements to current approaches that are used to achieve hyper-text transfer protocol (HTTP) adaptive streaming. These messages can be used in conjunction with computer circuitry configured to: determine a bandwidth available to the server for transmitting HTTP adaptive streaming content to a plurality of clients; receive HTTP requests from the plurality of clients for representations offered by the server in a manifest file for the HTTP adaptive streaming; and calculate an availability of each representation that is offered in the manifest file for the server. The availability can be calculated, at least in part, based on the determined bandwidth. The availability of each representation can be communicated from the server to the plurality of clients.

11 Claims, 9 Drawing Sheets

(52) U.S. Cl.
CPC ........ *H04L 65/608* (2013.01); *H04L 67/1002* (2013.01); *H04L 67/104* (2013.01)

(56) References Cited

U.S. PATENT DOCUMENTS

| | | | |
|---|---|---|---|
| 2008/0256255 | A1 | 10/2008 | Mordovskoi et al. |
| 2010/0299552 | A1* | 11/2010 | Schlack .................. H04L 47/10 714/4.1 |
| 2011/0167169 | A1 | 7/2011 | Ping et al. |
| 2012/0096121 | A1* | 4/2012 | Hao .................... H04L 67/2842 709/219 |
| 2012/0203867 | A1* | 8/2012 | Furbeck .............. H04L 65/4084 709/219 |
| 2012/0317303 | A1 | 12/2012 | Wang |
| 2013/0159498 | A1* | 6/2013 | Funge .................... H04L 65/80 709/224 |
| 2013/0254341 | A1* | 9/2013 | Ramakrishnan ........ H04L 47/25 709/219 |
| 2013/0268577 | A1 | 10/2013 | Oyman |
| 2013/0275557 | A1* | 10/2013 | Myers ................ H04N 21/2221 709/219 |
| 2013/0290493 | A1 | 10/2013 | Oyman et al. |
| 2014/0314237 | A1* | 10/2014 | Cottrell .................. H04H 60/02 381/2 |

OTHER PUBLICATIONS

Rovcanin et al; A DASH-based Performance-oriented Adaptive Video Distribution Solution; Broadband Multimedia Systems and Broadcasting (BMSB), 2013 IEEE International Symposium.

ISR for PCT/US2015/010353 filed Jan. 6, 2015; dated Mar. 30, 2015.

Extended European search report dated Oct. 17, 2017, in European Application No. 15733188.5, filed Jan. 6, 2015, 13 pages.

Office action (non-English) dated (Jul. 25, 2017); for JP Application No. 2016-538658; filed (Jan. 6, 2015); (official English translation).

* cited by examiner

| RepID | Bitrate (kbits/sec.) | RAB | Segment Availability Code |||||||||||||||||||| 
|---|---|---|---|---|---|---|---|---|---|---|---|---|---|---|---|---|---|---|---|---|---|---|
| | | | $SAB_0$ | $SAB_1$ | $SAB_2$ | $SAB_3$ | $SAB_4$ | $SAB_5$ | $SAB_6$ | $SAB_7$ | $SAB_8$ | $SAB_9$ | $SAB_{10}$ | $SAB_{11}$ | $SAB_{12}$ | $SAB_{13}$ | $SAB_{14}$ | $SAB_{15}$ | $SAB_{16}$ | $SAB_{17}$ | $SAB_{18}$ | $SAB_{19}$ |
| 0 | 1500 | $RAB_0$ | 1 | 0 | 0 | 1 | 1 | 1 | 0 | 1 | 1 | 1 | 1 | 0 | 0 | 1 | 1 | 1 | 0 | 1 | 1 | 1 |
| 1 | 2200 | $RAB_1$ | 1 | 1 | 1 | 1 | 1 | 1 | 1 | 1 | 1 | 1 | 1 | 1 | 1 | 1 | 1 | 1 | 1 | 1 | 1 | 1 |
| 2 | 2400 | $RAB_2$ | 0 | 0 | 0 | 0 | 0 | 0 | 0 | 0 | 0 | 0 | 1 | 1 | 1 | 1 | 1 | 1 | 1 | 1 | 1 | 1 |
| 3 | 3000 | $RAB_3$ | 1 | 0 | 1 | 0 | 1 | 0 | 1 | 0 | 1 | 0 | 1 | 0 | 1 | 0 | 1 | 0 | 1 | 0 | 1 | 0 |
| 4 | 3200 | $RAB_4$ | 0 | 1 | 1 | 1 | 0 | 1 | 1 | 1 | 0 | 1 | 1 | 1 | 0 | 1 | 1 | 1 | 0 | 1 | 1 | 1 |
| 5 | 3600 | $RAB_5$ | 1 | 1 | 1 | 1 | 1 | 1 | 1 | 1 | 1 | 1 | 0 | 0 | 0 | 0 | 0 | 0 | 0 | 0 | 0 | 0 |

FIG. 4

| Available Bandwidth (kbits/sec.) | Available Representation Code (ARC) |
|---|---|
| 7000 | 111111 |
| 3000 | 111100 |
| 2200 | 110000 |

FIG. 5

CLIENT/SERVER SIGNALING COMMANDS FOR DASH

RELATED APPLICATIONS

The present application claims priority to U.S. Provisional Patent Application No. 61/924,194, filed Jan. 6, 2014, the entire specification of which is hereby incorporated by reference in its entirety for all purposes.

BACKGROUND

Multimedia streaming services have helped drive the evolution of new mobile broadband technologies and standards, since digital video content is increasingly consumed on mobile devices. Many video streaming applications are frequently used on mobile devices for entertainment, communication, and other purposes. For example, online video streaming is offered by popular services such as YouTube™, Hulu™, Netflix™, Amazon Instant Video™, WatchESPN™, and others. In 2011, YouTube had more than 1 trillion global views. Ten percent of those views were accessed via mobile phones or tablets. As more smart phones, tablets, and other mobile computing devices are purchased, media servers will face increasingly heavy loads of streaming requests from multiple client devices. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a table that provides an example of an MPD file with available representations and available segments in accordance with an example;

FIG. 5 illustrates a table that provides an example of an available representation code for selected server bandwidths in accordance with an example;

Figure 1:
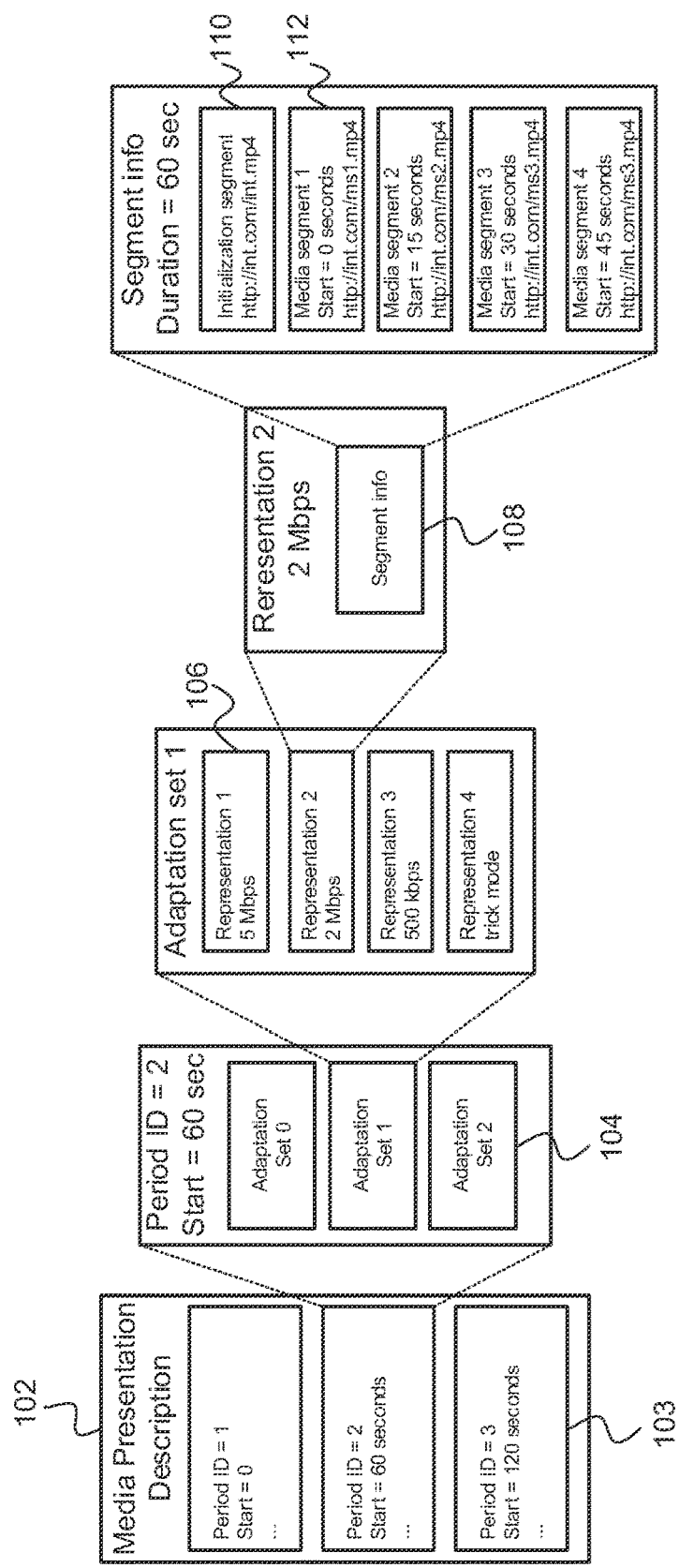
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Adaptive multimedia streaming allows different versions of the same multimedia file to be accessed by a mobile device while the multimedia is being streamed. Changes in radio link conditions can reduce or increase the available bandwidth at the mobile device. The ability to "adapt" by changing to different versions of the multimedia file while the file is presented at the mobile device enables the presentation to continue even when decreases in bandwidth occur.

Current adaptive multimedia streaming standards and specifications, including hyper-text transfer protocol (HTTP) based streaming services, such as progressive download and dynamic adaptive streaming over HTTP (DASH), have limitations which can reduce the quality of experience of users under certain conditions.

For example, clients are not currently able to anticipate beforehand when media servers will go offline for scheduled maintenance (or some other reason). Clients may have to infer that a server has gone offline after several requests have not been fulfilled and several buffering events have occurred. In addition, clients may also have to infer that the upload rate for a media server has changed after several buffering events have occurred. Either situation can result in a diminished client QoE (quality of experience).

In another example, when a first media server with desired content is overloaded, clients may be forced to stream content at slower rate. One or more additional servers with similar content may go online. However, clients may not be aware that the additional servers have gone online and therefore may continue to stream content at lower rates from the first server. This situation can also result in a diminished client QoE (quality of experience) relative to the QoE that could be achieved if clients were aware that desired content could be streamed from the additional servers.

In another example, dynamic adaptive streaming through HTTP (DASH) specifies formats for a media presentation description (MPD) metadata file that provides information about different formats, versions, and segments of media content that are available on a server. The MPD metadata file may be updated by the server when additional content becomes available through the server. However, clients may be unaware that the additional content is available for a period of time until the clients specifically request MPD updates from the server. During that period of time, clients whose QoE could be improved immediately do not enjoy any benefits that the additional content makes available.

In another example, a media server may support transcoding (e.g., direct conversion of one encoding to another to achieve a desired format or bitrate). Some clients may be better served by an encoding of media content that is not readily available on the server, but could be made available using the server's transcoding capabilities. These clients, however, may not be aware of the server's transcoding capabilities and may therefore not enjoy the benefits offered thereby.

In another example, network transfer rates may suddenly decrease when a mobile device is transported from one place to another. If the mobile device has already requested a high-bitrate segment of a representation from a server, however, there is currently no way to automatically cancel the request for the high-bitrate segment and replace it with a request for a lower-bitrate segment that is better suited for the reduced network transfer rate. This may cause a client to experience a buffering event, which may lower client QoE.

Wireless Multimedia Standards

There are a number of multimedia standards that have been developed to enable multimedia to be communicated to, from, or between mobile computing devices. For instance, in streaming video, the third generation partnership project (3GPP) has developed technical specification (TS) 26.234 (e.g., Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g., Release 11.0.0). 3GPP-based multimedia broadcast and multicast services (MBMS) specification TS 26.346 (e.g., Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g., Release 11.0.0) is mandated in all of these specifications to support file download and HTTP-based streaming use cases.

The standards described above are provided as examples of wireless multimedia standards that can be used to communicate multimedia files to, from, and/or between multimedia devices. The examples are not intended to be limiting. Additional standards may be used to provide streaming video or video sharing.

Streaming Media Standards

A more detailed explanation of HTTP streaming and the DASH standard is provided herein, in context with embodiments of the present invention. The detailed explanation is not intended to be limiting. As will be further explained in the proceeding paragraphs, examples described in the present disclosure can be used to facilitate communications between clients and servers that can improve client QoE in a DASH setting.

Hypertext transfer protocol (HTTP) streaming deliver of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft™ IIS Smooth Streaming, Apple™ HTTP Live Streaming, and Adobe™ HTTP Dynamic Streaming.

DASH is a standardized HTTP streaming protocol. As illustrated in FIG. 1, DASH can specify different formats for a media presentation description (MPD) metadata file 102. The MPD metadata file 102 can provide information on the structure and on the different versions of the media content representations stored on the server (as well as the segment formats). The MPD metadata file contains information about the initialization and media segments for a media player. This information provided by the MPD metadata file can be used by a media player to determine a container format and media timing information. This allows the media player to map segments into a media presentation timeline for switching and synchronous presentation with other representations. DASH technology has also been standardized by other organizations, such as the Moving Picture Experts Group (MPEG), the Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow fast adaptation to (1) changing network and wireless link conditions; (2) user preferences and device capabilities, such as display resolution; (3) different types of central processing units (CPU); (4) different memory resources; and so forth. The dynamic adaptation of DASH can provide a better quality of experience (QoE) for a user, with shorter startup delays and fewer re-buffering events than other streaming protocols.

Figure 2A:
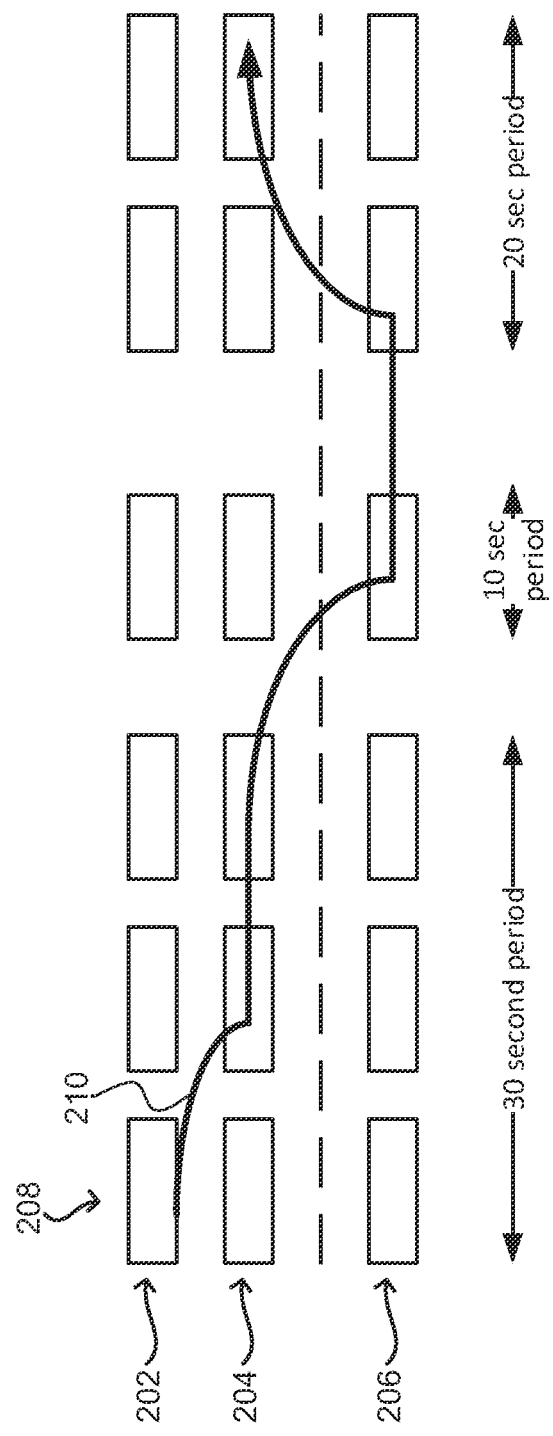
FIG. 2a illustrates an example of a hypertext transfer protocol (HTTP) adaptive stream (HAS) that varies over time in accordance with an example.
Figure 2B:
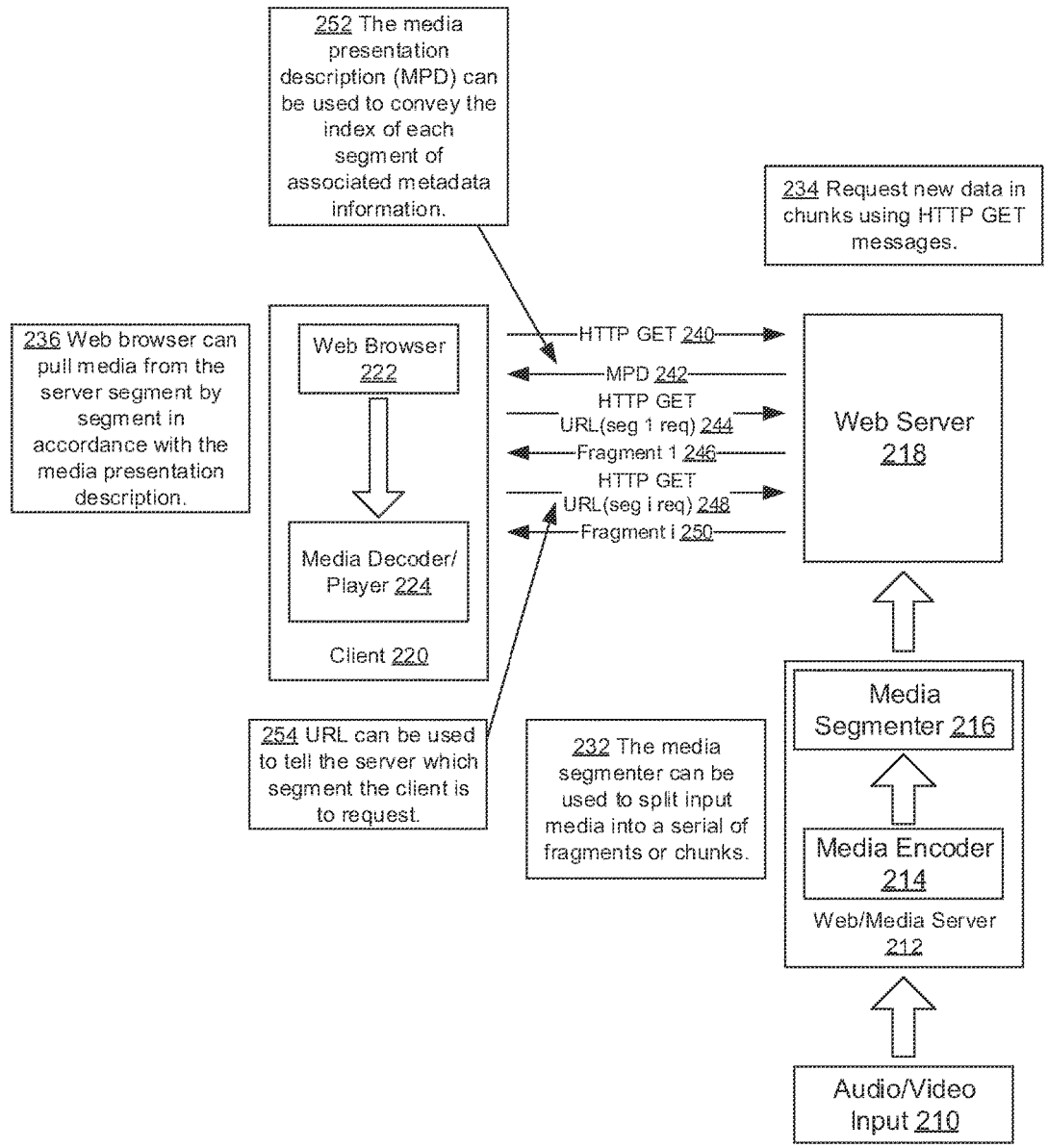
FIG. 2b illustrates a block diagram of hypertext transfer protocol (HTTP) streaming in accordance with an example.

In DASH, a media presentation description (MPD) metadata 102 can provide information about the structure and different versions of the media content representations stored in a web/media server 212, as illustrated in FIG. 2b. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different alternatives with bit rates, alternatives with mono, stereo, or surround sound, and so forth. In addition to offering different quality audio for a multimedia presentation over the period ID, the adaptation set may also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or performing other changes in location in the multimedia streaming file. In addition, the video may also be available in different formats, such as two-dimensional (2D) or three-dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs may be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, the system requirements, the potential types of interference, and so forth. The actual media segments or sub-segments may have a length that ranges from less than one second long to several minutes long.

FIG. 2a provides an example illustration of an HTTP adaptive stream (HAS) 210 that varies over time. In a first 30-second period, a client first retrieves segments 208 from a high quality representation 202. The segments in this example are approximately 10 seconds long. However, this is not intended to be limiting. Segments can be configured to be any desired length at the server. In addition, sub-segments can also be downloaded.

The client then retrieves two segments in a medium-quality representation 204. In a second period of 10 seconds duration, the client switches again and retrieves segments from a low-quality representation 206. The client may switch to the low-quality representation due to changes in radio link quality with the multimedia server. In a third period of 20 seconds duration, the client switches back to the medium-quality representation 204, as illustrated in FIG. 2a. The client can continue to request segments from a selected representation throughout the length of the HAS of the multimedia file from a server to a client operating on a multimedia device.

As shown in FIG. 2b, the MPD metadata information can be communicated to a client 220. The client can operate on a mobile device. A mobile device can be a wireless device configured to receive and display streaming media. In one embodiment, the mobile device may only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as by managing an on-time request and a smooth play-out of a sequence of segments, or by adjusting bitrates or other attributes to react to changes of a wireless link, a device state, or a user preference.

FIG. 2b illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server, segment by segment, in accordance with the MPD 242 as shown in 236. For instance, the web browser can request a first segment using a HTTP GET URL (frag 1 req) 244. A uniform resource locator (URL) or universal resource locator can be used to tell the web server which segment the client is to request 254. The web server can provide the first fragment (i.e., segment 1 246). For subsequent segments, the web browser can request a segment i using a HTTP GET URL (frag i req) 248, where i is an integer index of the segment. As a result, the web server can provide a segment i 250. The segments can be presented to the client via a media decoder/player 224.

Figure 3:
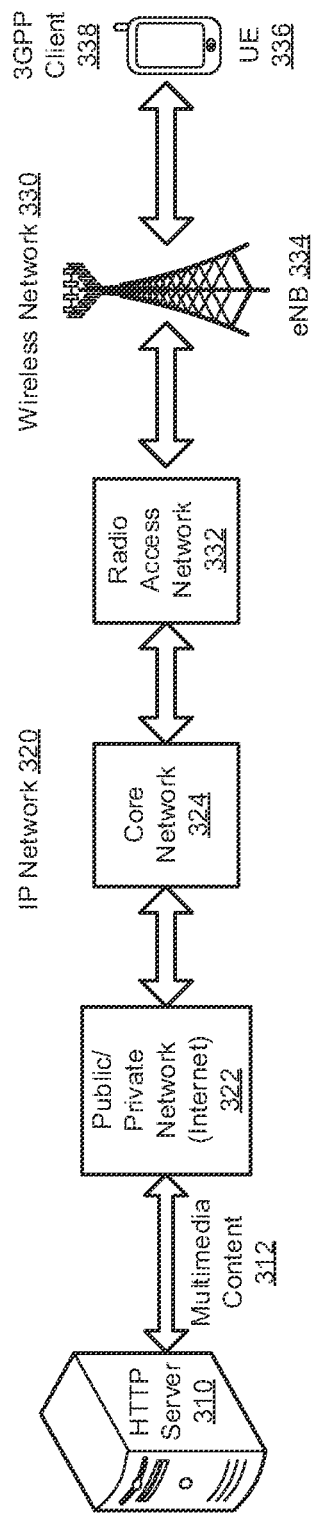
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 that provides the multimedia content and a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network (e.g., Rel. 11 or 12) or an IEEE 802.16 based network (e.g., 802.16-2009 or 802.16m-2011). The core network can access a wireless network 330, such as an evolved packet system (EPS), via a radio access network (RAN) 332. The RAN can provide the multimedia content to the client operating on the UE via a node (e.g., an evolved Node B (eNB) 334).

QoE Aware Adaptive Streaming

The Quality of Experience (QoE) of HTTP adaptive streaming (HAS) can be affected by the one or more servers hosting the representations and the corresponding segments. As previously discussed, the current specification assumes that all servers (base uniform resource locator (URL)) each include all of the representations and the corresponding segments. This means that servers that only have partial contents cannot be listed in the MPD file. If servers with partial content are listed in the MPD file, the client will not be able to determine that those servers do not have certain representations or segments until a request is made and not fulfilled from a specific server. When this occurs, the client QoE can drop sharply due to a delay in retrieving missing segments.

Servers can have a limited operational capacity. If a specific server becomes overloaded and is unable to deliver content in a proper time frame, there is no way for the server to inform one or more clients operating on the mobile device to reduce its download rate from the server to avoid potential segment retrieval delay or large packet loss.

In addition, servers can have limited bandwidth. When multiple clients share the common limited bandwidth and contend for resources, it is likely that the presence of several DASH streams to multiple users will cause congestion and diminish the playback experience at the clients. A reduced ability to provide segments by a server can lead to undesired re-buffering at the clients. This can be especially true for events where a large number of clients are attempting to fetch the same DASH content from a server.

Since media streaming often requires relatively large bandwidth resources, the load for media servers can often be very heavy. One approach that can help reduce loads on media servers is peer-assisted DASH (pDASH). In approaches that use peer-assisted DASH, clients that have already downloaded and cached certain segments of media content can offer those segments to other clients in a peer-to-peer arrangement. In this fashion, clients can stream at least some segments from other clients. This reduces the load on media servers because it allows clients to shoulder some of the load by acting as assistant servers in a limited capacity. In accordance with one embodiment, a media server may notify clients that peer-to-peer caching and streaming is available by sending a peer-to-peer (P2P) caching availability communication. A caching and streaming schedule among peering devices may be determined by a P2P server. The media server may send a P2P-server-identity-based communication to clients in order to notify the clients of the identity of the P2P server.

In accordance with another embodiment, a server can modify a set of DASH representations offered to clients in a manifest file, such as a MPD. The modification can enable the server to communicate, to a client, information such as the available representations and/or segments, the available server capacity, and/or the available server bandwidth or throughput. A client can then request representations that are actively available. If another server with a greater capacity or bandwidth is not available, the client can select a representation or segment that will not overload the available server capacity and bandwidth.

A server typically communicates supported base URL sites comprising a server internet protocol (IP) address, such as <Base URL>http://192.168.10.10/sintel/,/Base URL>. In addition to the server IP address, a binary code corresponding to each representation can be included that indicates if a selected representation is available at the server or not. For example, representation availability may be communicated using a binary code referred to as an available representation code (ARC). The communication from the server can include the ARC message, such as: <Base URL arc="0011001111">http://192.168.10.10/sintel/</BaseURL>. This will be discussed more fully in the proceeding paragraphs.

The ability to communicate the availability of a representation can enable a server to dynamically notify clients with updated binary code for available representations. This binary code can be used by the server to limit client requests to representations that will tax the server's capability and/or throughput. A client can include the updated binary codes in its bitrate adaptation logic and request only representations within the actively available list. The feedback mechanism allows clients that are served by the server to make decisions which will help avoid congestion issues at the server, thereby increasing the QoE at the client device by reducing re-buffering events and increasing the representation level that can be communicated to the client.

Available Representation Code

In accordance with an embodiment, a binary code, such as the ARC, can be predetermined for each representation in a manifest file, such as an MPD file. In one example, each ARC can assign a bit, referred to as a representation access bit (RAB), which can either be '0' or '1' for each representation. At run time, the server can compute the server's upload rate for the streaming media that is being served to the clients and dynamically update the ARC, which is then used to notify each client accordingly.

An ARC can be communicated in a number of different ways. In one example, an ARC can be added as an attribute to the BaseURL element in an MPD. Clients can then periodically request the MPD with updated ARC values. However, frequent MPD updates can lead to extra overhead traffic over network connections. In another example, an ARC can be sent via an HTTP Post request to a client. When this approach is used, the client can implement a simple HTTP server that can listen for such HTTP post requests. In another example, an ARC may be appended as a header value or as the first n bits (where n is the number of representations available) of a segment packet being sent to a client.

Segment Availability Code

In a pDASH arrangement, a participating peer device will generally not have all of a representation's segments cached at the same time. As a result, an efficient way of communicating segment availability would be very helpful in order to organize and coordinate peer-to-peer streaming in a pDASH arrangement. In accordance with another embodiment, segment availability may be communicated using a binary code referred to as a segment availability code (SAC). This communication from the server can include the SAC in a message, such as: <Representation_ID>: $\{0|1\}_m$, where m is the number of segments in the specified representation. This will be discussed more fully in the proceeding paragraphs.

By communicating segment availability to clients, the server can put clients on notice beforehand of which segments are not be available from the server. With this information, clients that come upon a segment that is unavailable on one server during streaming can immediately request the segment from an alternative server (in peer-assisted DASH, a peer device may be acting as a server). This obviates the need for the client to send several unfulfilled requests to the server—and possibly experience buffering events—before inferring that the segment is not available at the server.

In accordance with an embodiment, a binary code, such as the SAC, can be predetermined for each segment in a representation in a manifest file, such as a MPD file. In one example, each SAC can assign a bit, which can be either 0 or 1, for each segment. At run time, the server can dynamically update the SAC when the availability of one or more segments changes.

FIG. 4 provides a table that illustrates an example of an MPD file with available segments of available representations. In this example, the MPD file includes six different representations; each representation is labeled with a representation identification number (RepID) ranging from 0 to 5. Each representation has a different bitrate. In this example, RepID 0 has the lowest bitrate and RepID 5 has the highest bitrate, as measured in kilobits per second (Kbits/sec). Each representation RepID is also assigned a rate availability bit (RAB), with representation RepID 0 assigned to RAB5 and RepID 5 assigned to RAB0, as shown. Alternative arrangements are also possible, as can be appreciated.

Since the example MPD file contains 6 representations, the corresponding ARC can include 6 representation access bits (RABs) comprising RAB5-RAB0. In this example implementation, the most significant bit corresponds to the representation with the lowest bitrate and vice versa. This example is not intended to be limiting. A number of different types of codes can be used to communicate the ARC from the server to each client.

In addition, for each different representation, there are twenty different segments labeled with segment identification numbers (SegIDs) ranging from 0 to 19. In this example, each SegID is also assigned a segment availability bit (SAB), with SegID 0 assigned to SAB0 as shown. Since each representation described in the example MPD file contains 20 segments, the SAC corresponding to each representation can include 20 bits (e.g., SABs) comprising (SAB0-SAB19. A SAB value of 0 signifies that the corresponding segment is not available, while a SAB value of 1 signifies that the corresponding segment is available. Alternative mappings of SegIDs to SABs are also possible, as are alternative mappings of bit values to segment availability; this example is not intended to be limiting. Furthermore, as explained above, many different numbers of segments are possible; twenty segments are used in this non-limiting example in order to keep FIG. 4 from being excessively large or abstruse.

FIG. 5 provides an example table of ARC codes that are used to show selected available bandwidth rates at the server. As can be seen, for each representation at the server, when the corresponding available representation bit is set to a selected binary value, such as '0', the representation access by the client is disabled. When the available representation bit is set to the opposite binary value, such as '1', the representation access is enabled. This allows each client to know which representations are available to the client.

In the examples in the preceding paragraphs, a code is used to communicate which representations are available at a server. The code is communicated in each MPD file. However, the code may be communicated in other ways at a desired frequency depending on how quickly changes in server bandwidth or server capacity occur in a HAS system.

In a further example, during a streaming session, the server and client can perform a set of communications and other operations to increase the QoE by each client. The server can receive feedback information from each client to compute the bandwidth to be allocated for each user. The feedback information can contain the average quality perceived by the user and the number of re-buffering events experienced by the client during the HAS session. In one embodiment, the quality perceived by the user can be a pre-calculated quality factor that is associated with each segment and roughly estimates a mean opinion score (MOS) that will be achieved. This pre-calculated quality factor can be included in the manifest file, such as the MPD. The algorithms used for bandwidth allocation will be further discussed in the proceeding paragraphs.

The server can dynamically modify the ARC so that the download rate of one or more clients does not exceed a maximum supported bandwidth rate by the server, or a maximum supported rate by a specific client. The server can then transmit the updated ARC to the user through a response to user HTTP requests. Examples of communicating the ARC information include transmitting the ARC information in the manifest file, such as an MPD, transmitting the ARC information in a custom HTTP header, transmitting the ARC information via a separate radio channel other than a radio channel used to communicate the HAS, transmitting the ARC via higher layer signaling, transmitting the ARC via an HTTP post request, or transmitting the ARC by appending the ARC to a segment packet sent to the client. The client can then receive the ARC and use the information in the client's bit rate adaptation algorithm when making subsequent requests.

In addition, there are a number of additional types of communications that can facilitate an improved QoE for clients. As explained above, a server may update an ARC corresponding to certain media content. The server may dynamically update an ARC based on QoE information sent by the clients in addition to its knowledge regarding the streamed content. Such an ARC update might occur for a variety of reasons as the server attempts to maximize QoE for a number of clients. If network traffic is too heavy for the server to stream the representation with the highest bitrate to all clients, for example, the server may make the representation with the highest bitrate unavailable to mitigate any QoE imbalance between clients. In order for the server to ensure fair QoE to all clients, the server can deactivate (reject or delay) a representation with the highest bitrate from a client who has previously had a high QoE while enabling a representation with the highest bitrate to another client who has previously had a low QoE. On the other hand, if the load on the server is reduced, the server may make the representation available again. In either case, the ARC would be updated to represent the changed availabilities of the representations. When such an update occurs, the server may send an ARC-change communication to one or more clients in order to notify the clients that a change has occurred in the ARC. Clients can then immediately send a request for the updated version of the ARC.

In another example, during a streaming session, an MPD file at a server may be updated. This update might, for example, indicate a change in the representations that are available or a change in the segments that are available for one or more representations. The server may send an MPD-change communication to a plurality of clients indicating that the MPD file has been changed. Clients may then immediately request the updated version of the MPD file rather than waiting to make the request according to some predetermined periodic schedule. The updated version of the MPD file may provide clients with information that enables increasing client QoE. For example, an updated MPD file might indicate that new representation with higher bitrate is available for the media content that a client is currently streaming. The client can immediately request that a subsequent segment be selected from the new representation with the higher bitrate.

In another example, a server can send a server-availability communication to a plurality of clients indicating that the media server will go offline at a specified time. Clients that receive this communication may, in turn, use this information to adjust their operations in several ways. For example, if a request made to the server has not been fulfilled before the specified time, the client can immediately send the request to an alternative server when the specified time arrives. Furthermore, the client can immediately send any subsequent requests to an alternative server. In both cases, the client would be informed beforehand of the futility of waiting for a request to be fulfilled from the server.

In another example, during a streaming session, a server may adjust its upload rates (e.g., in response to different loading conditions). When the server makes such an adjustment, the server can send an upload-rate communication to a plurality of clients indicating that the upload rates have changed. This obviates the need for clients to wait and eventually infer that upload rates have changed when streaming performance changes are observed. Hence, clients can immediately adjust their operations in several ways. For example, if the upload rate has decreased, clients can immediately choose to request subsequent segments from representations with lower bitrates in order to avoid buffering events. On the other hand, if the upload rate has increased, the client may request subsequent segments from representations with higher bitrates.

In another example, during a streaming session, a first server may receive notice that a second server that has at least one representation in common with an MPD file at the server has recently gone online. The first server may then send a new-server communication to a plurality of clients indicating that the second server is available as an alternative from which clients may stream desired media content. Clients may then make an informed decision to either continue streaming desired content from the first server or to commence streaming desired content from the second server. A client that has experienced poor transfer rates with the first server, for example, can immediately choose to commence streaming from the second server in order to receive the desired media content at a better transfer rate.

In some cases, client devices may benefit from receiving media content in an encoding that is not immediately available on a media server, but that can be provided by the media server through transcoding. A client device may, for example, may have a limited storage capacity and may therefore benefit from having file sizes reduced. A client device may also not support any of the formats with which media content representations are stored on the media server. To address these types of issues, a media server may offer transcoding capabilities whereby one encoding can be directly converted to another. Many different transcoding methods, such as constant bit rate (CBR) transcoding, variable bit rate (VBR) transcoding, and 2-pass variable bit rate (2-Pass VBR) transcoding, may be used. In a DASH context, a media server may send a transcoding-capability communication to a plurality of clients in order to inform the clients that the media server is capable of transcoding DASH media content. The media server may also send a transcoding-support communication to a plurality of clients that indicates what specific types of transcoding the media server supports, including available configurations for converting codecs, encapsulation formats, MIME types, bitrates, resolutions, and frame rates. A client, in response, may send a communication indicating which type of transcoding, if any, the client selects.

During a streaming session, a client may experience changes in QoE. In order to assist the media server in improving client QoE, the client may periodically send a communication to the server indicating the average QoE. This communication may include information pertaining to one or more metrics, such as the average download rate, the number of buffering events, and the average mean opinion score (MOS). Media servers can use this type of client feedback to dynamically determine how to best perform load balancing between streaming clients.

In addition, a client user equipment may be configured to detect when the UE has experienced a change in QoE during a streaming session. When such a change has occurred, the client UE can be configured to automatically send a request for a new segment of a representation; this segment chosen based, in part, on the detected QoE change. If the QoE has changed because the download rate has decreased, for example, the UE can request a new segment with a lower bitrate so that buffering events will be less likely. On the other hand, if the download rate has increased, the UE can request a new segment with a higher bitrate. In addition, the UE can also be configured to automatically send a cancellation request to the media server for any downloads that were requested prior to the request for the new segment. This enables the media server to stop sending any previously requested segments immediately.

In a peer-assisted DASH (pDASH) setting, a client UE may also send a peer-to-peer (P2P) caching availability communication that indicates whether the UE supports a P2P streaming mode. A P2P server can receive this type of communication from a plurality of UEs and devise a caching and streaming schedule for peering devices accordingly.

Where a media server offers transcoding services, a UE can also be configured to send a DASH-representation-recommendation communication to the media server that indicates which codec, encapsulation, MIME type, bitrate, resolution, and/or frame rate formats are recommended for the UE. This can enable the media server to select a representation and representation segments that are appropriate for the UE.

Figure 6:
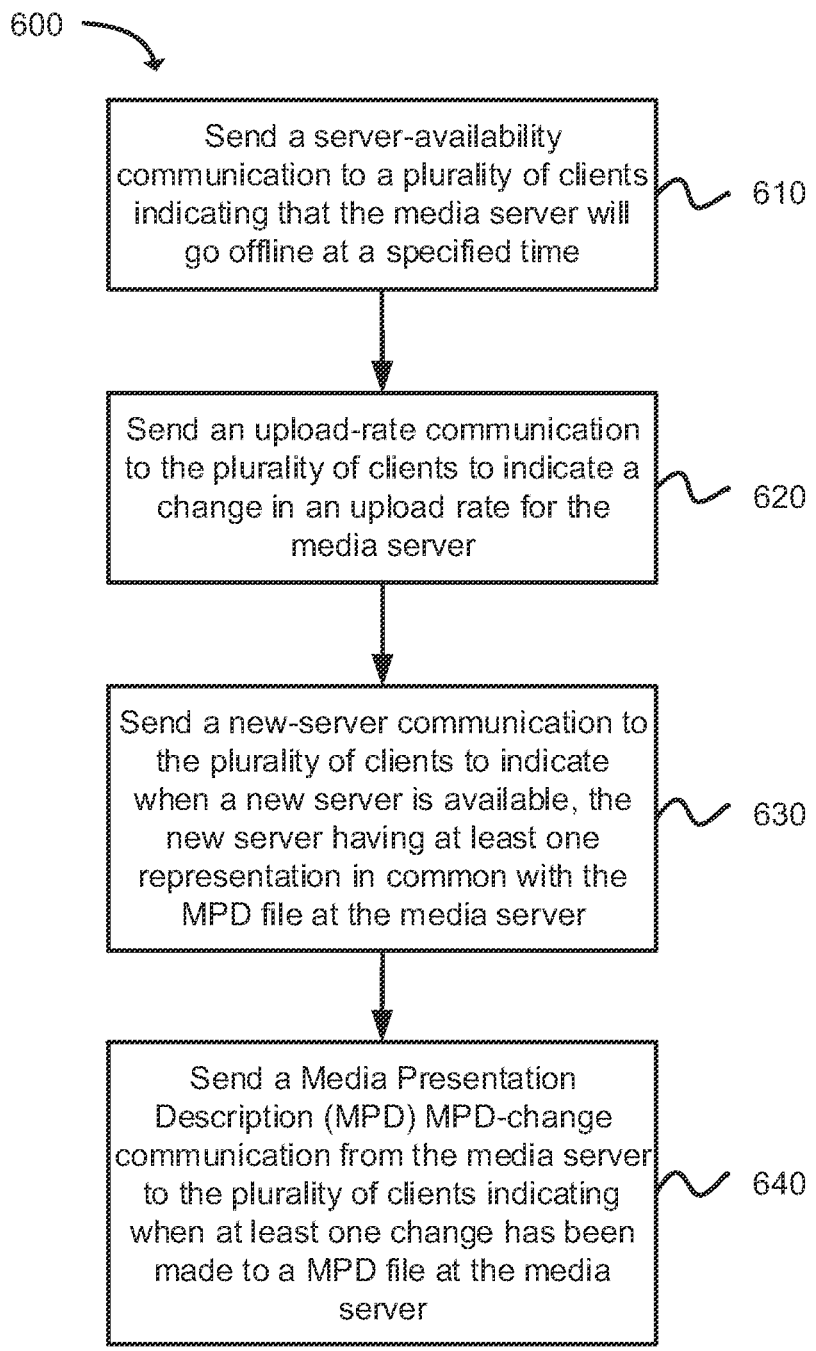
FIG. 6 depicts functionality of computer circuitry of a server operable to provide HTTP adaptive streaming in accordance with an example.

FIG. 6 illustrates functionality 600 of computer circuitry of a media server operable to provide hyper-text transfer protocol (HTTP) adaptive streaming and send several different types of communications to clients, as shown in the flow chart in FIG. 6. As in 610, the media server can send a server-availability communication to a plurality of clients indicating that the media server will go offline at a specified time. As in 620, the media server can send an upload-rate communication to the plurality of clients to indicate a change in an upload rate for the media server. As in 630, the media server can send a new-server communication to the plurality of clients to indicate when a new server having at least one representation in common with the MPD file at the media server becomes available. As in 640, the media server can send a Media Presentation Description (MPD) MPD-change communication from the media server to the plurality of clients indicating when at least one change has been made to a MPD file at the media server. One or more of these messages may be sent, as needed. The different types of messages may also be sent in any order.

In one example, the media server may have circuitry further configured to associate an available representation code (ARC) with the representations that are available on the media server. The ARC can comprise a binary string wherein each bit corresponds to a representation that is available on the media server. In some embodiments, a bit value of 1 in the ARC can signify that the representation corresponding to that bit is available. One or more bits in the ARC can be sent to a client via an HTTP post request. The ARC can also be appended to a segment packet sent to a client or included in the header of the segment packet. The ARC can also be included as an attribute in a MPD metafile. Furthermore, the media server can also have circuitry configured to automatically send an ARC-change communication to the plurality of clients whenever a change is made to the ARC.

In another example, the media server can have circuitry configured to associate a segment availability code (SAC) with a media presentation description (MPD) metafile. The SAC can comprise a binary string wherein each bit corresponds to the availability of a segment in a representation associated with the MPD metafile. IN some embodiments, a bit value of 1 in the SAC can signify that the segment corresponding to that bit is available.

In another example, the media server can have circuitry configured to send a peer-to-peer (P2P) caching availability communication to a plurality of clients indicating whether P2P caching and streaming is available. In addition, the media server can have circuitry configured to send a P2P-server-identity communication to a plurality of clients indicating the identity of a P2P server that is responsible for managing a caching and streaming schedule among peering devices.

Figure 7:
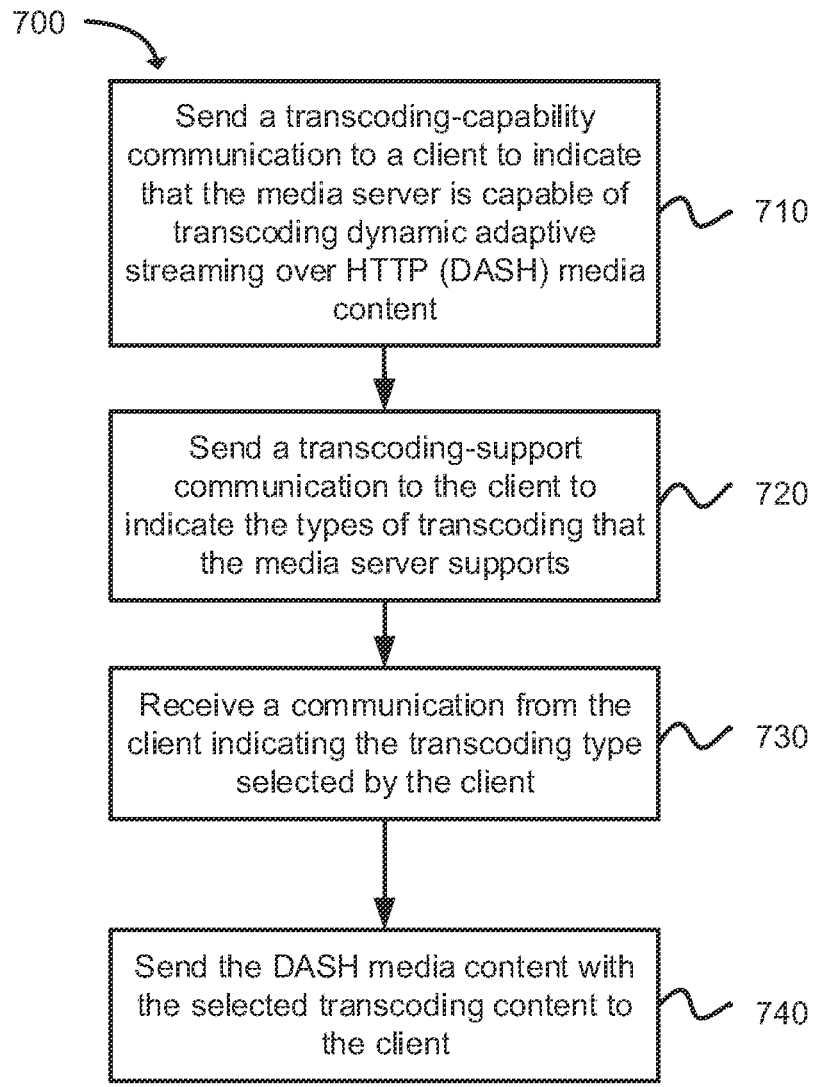
FIG. 7 depicts functionality of computer circuitry of a mobile device operable to provide HTTP adaptive streaming in accordance with an example.

FIG. 7 illustrates functionality 700 of computer circuitry of a media server operable to provide hyper-text transfer protocol (HTTP) adaptive streaming and send several different types of transcoding communications to clients, as shown in the flow chart in FIG. 7. As in 710, computer circuitry at the media server can be configured to send a transcoding-capability communication to a client to indicate that the media server is capable of transcoding dynamic adaptive streaming over HTTP (DASH) media content. As in 720, computer circuitry at the media server can also be configured to send a transcoding-support communication to the client to indicate the types of transcoding that the media server supports. The transcoding-support communication can include available configurations for converting codecs, encapsulation formats, MIME types, bitrates, resolutions, and frame rates. The transcoding-support communication can also indicate whether the media server supports constant bit rate (CBR) transcoding, variable bit rate (VBR) transcoding, and 2-pass variable bit rate (2-Pass VBR) transcoding. As in 730, computer circuitry at the media server can also be configured to receive a communication from the client indicating the transcoding type selected by the client. As in 740, the media server can send the DASH media content with the selected transcoding content to the client.

Figure 8:
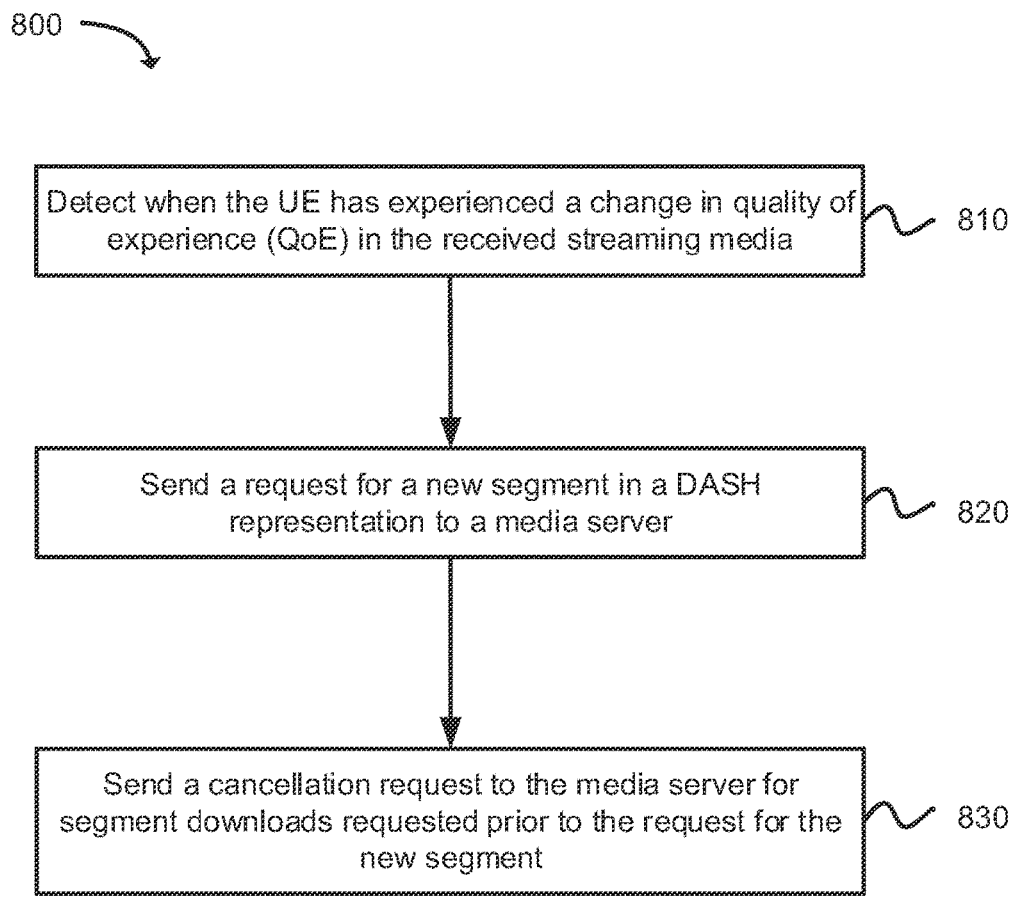
FIG. 8 illustrates a block diagram of a method for providing variable bitrate adaptive streaming of multimedia from a server to a plurality of clients in accordance with an example.

FIG. 8 illustrates functionality 800 of computer circuitry of a UE operable to use hyper-text transfer protocol (HTTP) adaptive streaming and communicate with a media server, as shown in the flow chart in FIG. 8. As in 810, circuitry at the UE can be configured to detect when the UE has experienced a change in quality of experience (QoE) in the received streaming media. As in 820, circuitry at the UE can also be configured to send a request for a new segment in a DASH representation to a media server. As in 830, circuitry at the UE can also be configured to send a cancellation request to the media server for segment downloads requested prior to the request for the new segment to enable the media server to stop sending the segment downloads requested prior to the request for the new segment.

In another example, circuitry at the UE can also be configured to send a peer-to-peer (P2P) caching availability communication to the media server that indicates whether the UE supports a P2P streaming mode. Circuitry at the UE can also be configured to send a QoE communication to the server that indicates an average quality of experience of the received streaming media during a streaming event to the media server. Circuitry at the UE can also be configured to send a DASH representation-recommendation communication to the media server that indicates which codec, encapsulation, MIME type, bitrate, resolution and/or frame rate formats are recommended for the UE. Circuitry at the UE can also be configured to send the request for a new segment in a DASH representation and the cancellation request automatically when a user performs a seek operation associated with the streaming media. Circuitry at the UE can also be configured to send the request for a new segment in a DASH representation and the cancellation request automatically when the QoE of the streaming media falls below a threshold value.

Figure 9:
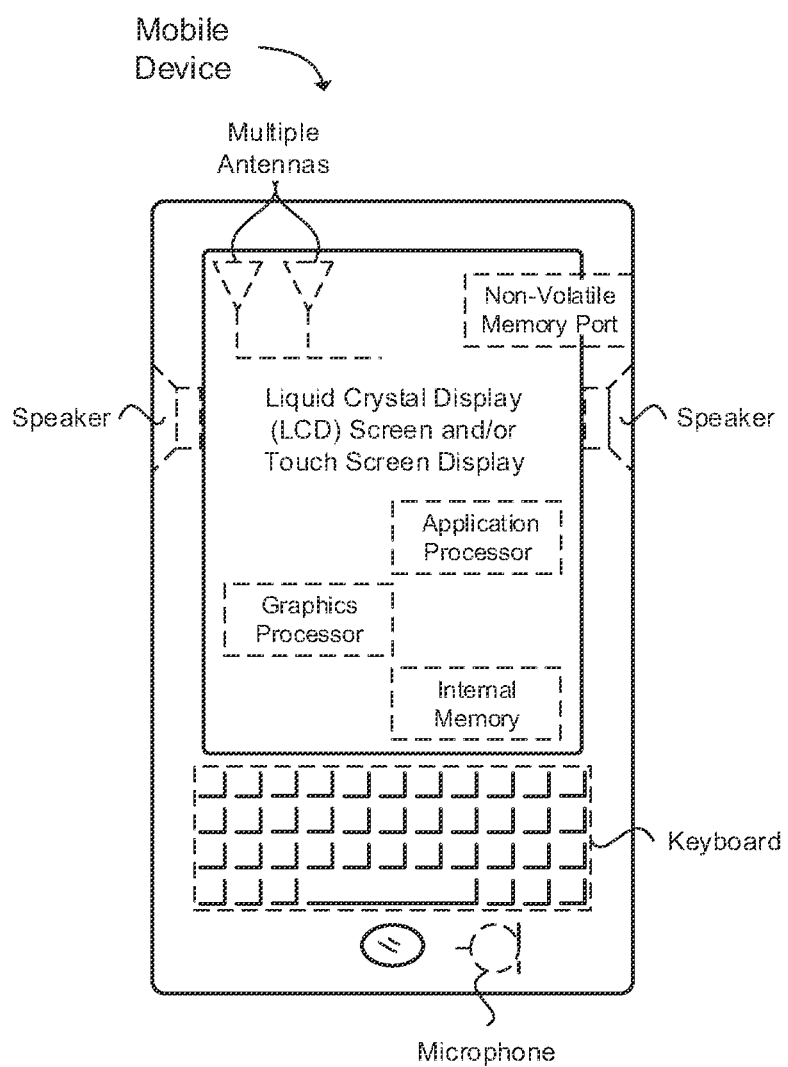
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. While examples are provided of a mobile wireless device, the device does not necessarily need to be wireless. A wired device can also be used for HAS.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A media server operable to provide hyper-text transfer protocol (HTTP) adaptive streaming, wherein the media server comprises:

a transceiver configured to:

send a server-availability communication to a plurality of clients indicating that the media server will go offline at a specified time;

send an upload-rate communication to the plurality of clients to indicate a change in an upload rate for the media server;

send a new-server communication to the plurality of clients to indicate when a new server is available, the new server having at least one representation in common with a Media Presentation Description (MPD) file at the media server;

send an MPD-change communication from the media server to the plurality of clients indicating when at least one change has been made to the MPD file at the media server to enable the media server to efficiently deliver the HTTP adaptive streaming; and one or more processors configured to:

associate an available representation code (ARC) with the representations that are available on the media server, the ARC comprising a binary string wherein each bit corresponds to a representation of the representations that are available on the media server;

identify Quality of Experience (QoE) information received from the plurality of clients;

deactivate a representation with a highest bitrate for one or more clients to ensure fair QoE; and dynamically update the ARC using the QoE information sent by the plurality of clients, wherein the transceiver is further configured to send a segment availability code (SAC) to the plurality of clients, wherein the SAC is a binary string wherein each bit corresponds to an availability of a segment in a representation of a media presentation description (MPD) metafile; and in response to the plurality of clients receiving the SAC, the plurality of clients request the segment from an alternative media server when the SAC indicates that the segment is unavailable.

2. The media server of claim 1, wherein the transceiver is further configured to send a value of at least one bit in the ARC to a client via an HTTP Post request to the client.

3. The media server of claim 1, wherein the one or more processors are further configured to append the ARC to a segment packet to send to a client.

4. The media server of claim 1, wherein the one or more processors are further configured to append the ARC as a header to a segment packet to send to a client.

5. The media server of claim 1, wherein the one or more processors are further configured to include the ARC in a media presentation description (MPD) metafile as an attribute.

6. The media server of claim 1, wherein the transceiver is further configured to automatically send an ARC-change communication to the plurality of clients whenever a change is made to the ARC.

7. The media server of claim 1, wherein a bit value of 1 in the ARC signifies that the representation corresponding to that bit is available.

8. The media server of claim 1, wherein the one or more processors are further configured to:
   associate the SAC with the MPD metafile, the SAC comprising the binary string wherein each bit corresponds to the availability of the segment in the representation associated with the MPD metafile.

9. The media server of claim 8, wherein a bit value of 1 in the SAC signifies that the segment corresponding to that bit is available.

10. The media server of claim 1, wherein the transceiver is further configured to send a peer-to-peer (P2P) caching availability communication to a plurality of clients indicating whether P2P caching and streaming is available.

11. The media server of claim 10, wherein the transceiver is further configured to send a P2P-server-identity communication to a plurality of clients indicating the identity of a P2P server that is responsible for managing a caching and streaming schedule among peering devices.

* * * * *